July 27, 1965   V. MILENKOVIC ET AL   3,196,793
FOLDED FIN ROCKET
Filed Jan. 16, 1963
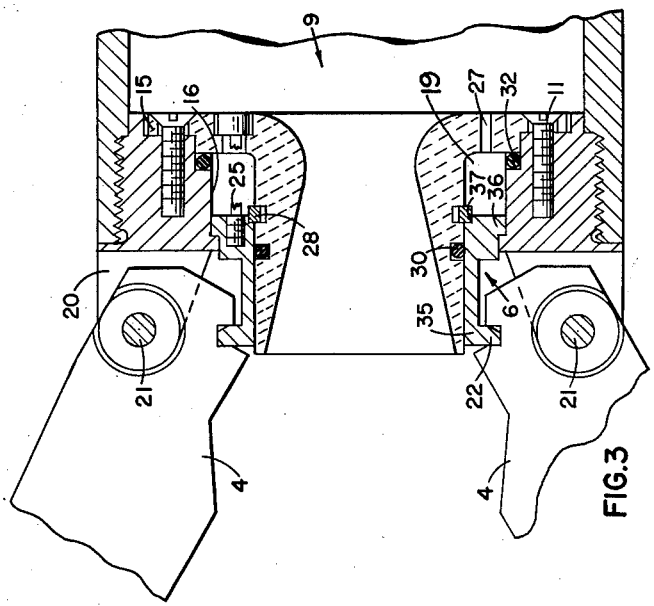
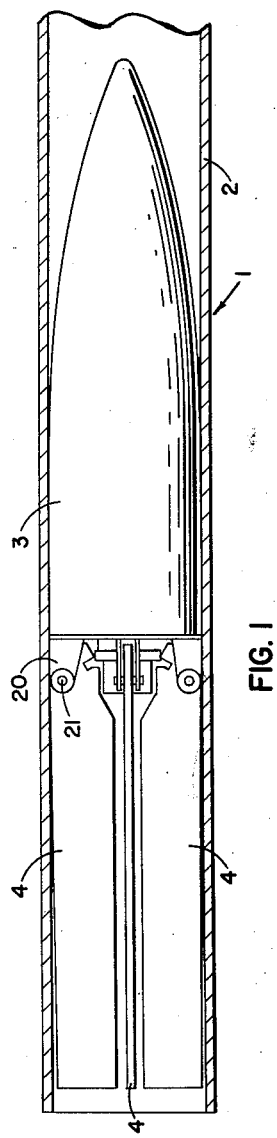
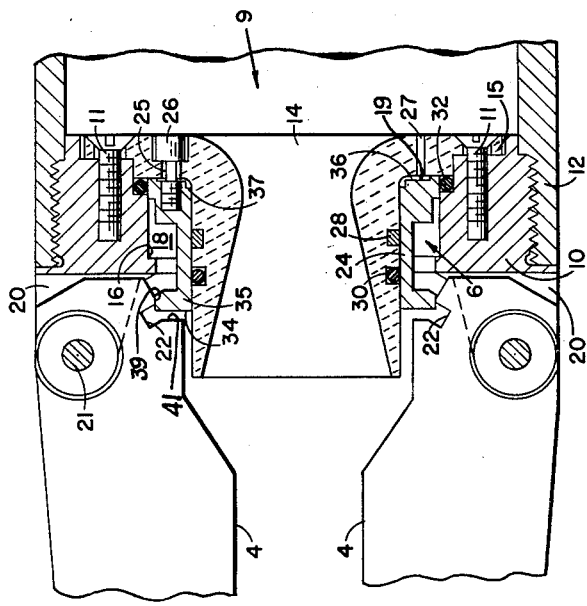
Veljko Milenkovic
Philip A. Saigh
Earl K. Takata,
INVENTORS.

3,196,793
FOLDED FIN ROCKET
Veljko Milenkovic, Norridge, Philip A. Saigh, Morton Grove, and Earl K. Takata, Arlington Heights, Ill., assignors, by mesne assignments, to the United States of America as represented by the Secretary of the Army
Filed Jan. 16, 1963, Ser. No. 251,991
8 Claims. (Cl. 102—49)

This invention relates to a fin stabilized rocket and more particularly to a smooth bore launched rocket having foldable stabilizing fins.

Stabilizing fins which extend beyond the diameter of a rocket's body are desirable in that such fins impart greater in-flight stability to the rocket than do smaller stabilizing fins and therefore a higher degree of accuracy can be achieved with such a rocket. However, firing a large rigid fin type rocket from a smooth bore launcher presents problems, since the bore diameter can be no smaller than the diameter of the fins. It is desirable, therefore, to have a rocket in which the stabilizing fins can be kept in a folded position until after the rocket has left the launcher and then be expanded to a stabilizing position, thus allowing the bore diameter to be only as large as the diameter of the rocket body.

Therefore, it is an object of this invention to provide a foldable fin type rocket capable of being fired from a smooth bore launcher.

Another object of this invention is to provide a smooth bore launched folded fin rocket having greater in-flight stability than a similar rocket having smaller fixed fins.

Still another object of this invention is to provide a folded fin rocket having a mechanism which utilizes the thrust of the rocket to erect the foldable stabilizing fins.

These and other objects of the invention will become more apparent upon consideration of the following detailed description and accompanying drawings, in which:

FIGURE 1 is a sectional view of the launcher with a rocket therein before fin erection;

FIGURE 2 is an enlarged fragmentary sectional view of the rocket before fin erection; and FIGURE 3 is a view similar to FIGURE 2 showing the fins in erected position.

Referring to the drawings, FIGURE 1 shows a folded fin rocket 1 lying in its launcher 2. The rocket includes a body 3, foldable fins 4, a fin erecting mechanism 6 (FIGURES 2 and 3), and a nozzle 14.

Rocket body 3 includes an annular backing plate 10 affixed to the rear 12 of the body and contains a conventional propulsion system 9 which exhausts thrust gases to the atmosphere through nozzle 14. Nozzle 14 extends through a central opening 16 in backing plate 10. The outer diameter of the nozzle is such that an anular space 18 is formed between the nozzle and the backing plate. A peripherial flange 15 is formed integral with nozzle 14 adjacent the entrance thereof. Screws 11 extending through flange 15 are screwed into suitably tapped openings in backing plate 10 to fix the nozzle to the backing plate.

Backing plate 10 has spaced rearward extending projections 20 to which the stabilizing fins 4 are pivotally attached by pivot pins 21. Each fin has a notch 22 formed in its innermost edge adjacent the pivot pin 21. The open ends of said notches are disposed toward the longitudinal axis of the rocket. To erect fins 4 when the rocket is in flight, the notch of each fin becomes engaged by the fin erecting mechanism 6.

Fin erecting machanism 6 (FIGURE 2) includes a one piece cylindrical sleeve-like piston 24 slidably mounted in annular space 18 between nozzle 14 and backing plate 10. Release screws 26 extend through the peripheral flange 15 of nozzle 14 and are threaded into suitably tapped holes in the forwardmost end 36 of the piston. The shank portions of screws 26 are necked down, as illustrated at 25, to provide for breaking under a predetermined tension to permit movement of the piston as explained hereinbelow. The rearwardmost end 34 of piston 24 is provided with a peripheral flange 35 which projects outwardly. Flange 35 cooperates with surfaces 39 on the several fins 4 to hold the fins in the folded position illustrated in FIG. 2. End 34 of piston 24 is spaced from surfaces 41 of notches 22 so as to allow the fins to be released from flange 35 and to allow piston 24 to impact against surfaces 41. Due to the spacing of end 34 from surfaces 41, piston 24 will be able to move more rapidly initially and move the fins into an extended position with less initial force. This is true due to the fact that piston 24 moves under no load, after breaking of screws 26, before striking surfaces 41. After piston 24 has impacted surfaces 41 the fins are pivoted outwardly until notches 22 are fully engaged around flange 35. With the specific arrangement of the flange and fin structure, the fins are positively held in the folded position and the fins are moved to the extended position by an impact type force.

Sealing between piston 24 and the outer wall of the nozzle 14 is effected by means of an O-ring 30 and a piston ring 28 mounted in suitable grooves formed in the peripheral wall of the nozzle. Sealing between the outer surface of piston 24 and the wall of opening 16 through backing plate 10 is effected by an O-ring 32 clamped between the backing plate and peripheral flange 15 on nozzle 14.

A bleed orifice 27 extends through the peripheral flange 15 of nozzle 14 and provides communication between the combustion chamber within the rocket and an annular chamber 19, one wall of which is formed by forward end 36 of piston 24.

In operation the rocket is inserted into its launcher 2 with its fins in a folded position (FIGURE 1). The rocket is then ignited by conventional means (not shown) and the thrust gases produced are exhausted through nozzle 14 to propel the rocket. While moving down the bore of the launcher, a portion of the thrust gases pass through orifice 27 to the annular chamber 19 adjacent the forward end 36 of piston 24. This portion of thrust gases produces a force on the piston which acts to move the piston rearward in a fin opening direction. This force is balanced while the rocket is still in the launcher by thrust gases which have already passed through nozzle 14 and which, being confined in the tube, produce a force on the piston at its flanged end 34 equal and opposite to the first mentioned force. Thus, as the rocket travels the length of the launcher all forces acting on the piston are balanced.

When the rocket leaves the launcher the force on the rear end of piston 24 drops to approximately atmospheric pressure. The high pressure thrust gases entering orifice 27 now produce an unbalanced force on the piston which acts to shear necked portion 25 of release screw 26 (FIGURE 3). The piston now moves rearward under the influence of these gases. When piston 24 moves rearward flange 35 engages notches 22 and forceably pivots fins 4 into an extended stabilizing position.

As the rocket moves through the air, wind resistance on the extended fins 4 tends to return the fins and piston 24 to fin folded position. After the piston has moved to its rearward position, piston ring 28 springs outwardly from its groove and engages a notch 37 formed at the forward end 36 of piston 24, thus locking the piston, and turn fins 4, in extended position.

Thus it will be appreciated that this invention provides a folded fin rocket having the capability of being fired from a smooth bore launcher and which utilizes thrust gases from the rocket to extend the folded fins into a stabilizing position upon launching.

It is to be understood that various modifications of the rocket can be made without changing the spirit and scope of the invention as claimed.

The invention claimed is:

1. A folded fin rocket comprising: a rocket body, said body containing a propulsion system; a backing plate affixed to the rear of said body and having a central opening therethrough; a plurality of spaced stabilizing fins pivotally fastened to said backing plate and arranged in a folded position; a nozzle mounted to said backing plate and extending through said opening; a one piece sleeve-like piston slidably disposed between said nozzle and said backing plate; a release screw holding said piston in a fin folded position; means for establishing a pressure differential across said piston, said pressure differential causing shearing of said release screw and driving the piston to pivot said fins into an extended stabilizing position; and means disposed about said nozzle and engaging said piston for preventing the return of said piston to a fin folded position.

2. An invention as set forth in claim 1, in which said release screw threadably couples said piston to said nozzle, said screw having a necked portion adapted to shear under a predetermined tension.

3. An invention as set forth in claim 1, in which said means for preventing return of the piston comprises an internal groove in said piston and a piston ring disposed in a groove about the periphery of said nozzle, said ring being adapted to spring outwardly from said groove to engage the groove in said piston.

4. A folded fin rocket comprising: a rocket body containing a propulsion system; a nozzle mounted on said body and providing for the exhaust of thrust gases from said propulsion system; foldable stabilizing fins pivotally fastened to said body; and a fin erecting mechanism, said mechanism including a one piece sleeve-like piston slidably disposed about said nozzle, means for establishing a pressure differential across said piston, said piston acting to pivot said fins into a rocket stabilizing position under the influence of said pressure differential, a piston ring operatively disposed about the periphery of said nozzle in engagement with said piston and acting to prevent the pivoting of the fins into an unstabilizing position and a release screw holding said piston in a fin folded position, said screw shearing under said pressure differential to allow the piston to be driven into a fin extended position.

5. A folded fin rocket comprising: a rocket body, said body containing a propulsion system; a backing plate affixed to said body and having an opening therethrough; a plurality of spaced stabilizing fins pivotally connected to said backing plate and arranged in a folded position; a nozzle mounted to said backing plate and extending through said opening, the outer periphery of said nozzle being spaced from the opening through said backing plate so as to define a space between said backing plate and nozzle; a sleeve-like piston mounted in said space and being sealably and slidably disposed relative to said nozzle and said backing plate so as to define an annular fluid chamber therewith; means communicating fluid pressure from said propulsion system to said annular chamber; and means on said piston coacting with means on said fins for actuating said fins from a fin folded position to a fin extended position when said piston is actuated by said fluid pressure.

6. A folded fin rocket as set forth in claim 5, in which said means on said piston includes a flange, said means on said fins includes surfaces on said fins coacting with the outer periphery of said flange to hold said fins in retracted position, an impacting surface on each of said fins spaced from said piston when in the fin folded position, and a notch in each said fin between said impacting surface and said surface which coacts with the outer periphery of said flange, said notch extending radially outwardly from and at an obtuse angle to said impact surface.

7. A folded fin rocket mechanism comprising: a backing plate having an opening therethrough; a plurality of spaced stabilizing fins pivotally connected to said backing plate and arranged in a folded position; a nozzle mounted to said backing plate and extending through said opening; a sleeve slidably mounted on the outer periphery of said nozzle, said sleeve having a flange on one end thereof, said sleeve being actuated by means coacting with the other end thereof; each of said fins having an impacting surface spaced from said one end of said sleeve when in the fin folded position and a notch which extends radially outwardly from and at an obtuse angle to said impact surface, each of said fins also including a surface at the side of said notch which is remote from said impact surface, the outer periphery of said flange coacting with said surface at the side of said notch when said one end of said sleeve is spaced from said impacting surface to hold said fins in the folded position.

8. A foldable fin rocket capable of being fired from a smooth bore launcher, the fins of said rocket being folded to an unstablilizing position while said rocket is contained in said launcher, said rocket having a fin erecting mechanism to move said fins to a stabilizing position upon launching of the rocket, said mechanism being operated by the thrust gases of said rocket and comprising: a one piece sleeve-like piston in engagement with said fins and coacting with means on said fins to hold said fins in said unstable position, said piston being actuated by rocket thrust gases to move from a fin folded position to a fin extended position; a release screw holding said piston in said folded position; and locking means in said piston and nozzle disposed to prevent the return of said piston from said extended to said folded position.

References Cited by the Examiner

UNITED STATES PATENTS

| 2,821,924 | 2/58 | Hansen et al. | 102—50 |
| 2,938,429 | 5/60 | Jaglowski et al. | 102—50 |

FOREIGN PATENTS

| 1,270,054 | 7/61 | France | 102—50 |

(Corresponding U.S. 3,098,446, July 23, 1963)

BENJAMIN A. BORCHELT, *Primary Examiner.*

SAMUEL FEINBERG, *Examiner.*